United States Patent [19]

Lovisek

[11] 4,046,051
[45] Sept. 6, 1977

[54] THREAD FORMING SCREW
[75] Inventor: Louis J. Lovisek, Greenlawn, N.Y.
[73] Assignee: Industrial Fasteners Corporation, New York, N.Y.
[21] Appl. No.: 614,179
[22] Filed: Sept. 17, 1975

Related U.S. Application Data

[63] Continuation-in-part of Ser. No. 523,689, Nov. 14, 1974, abandoned.

[51] Int. Cl.$^2$ ............................................. F16B 33/02
[52] U.S. Cl. ............................................. 85/47; 85/48
[58] Field of Search ............................................. 85/46–48, 85/41; 10/10 R, 152 T

[56] References Cited

U.S. PATENT DOCUMENTS

| | | | |
|---|---|---|---|
| 2,352,982 | 7/1944 | Tomalis | 85/47 |
| 3,159,842 | 12/1964 | Neuschotz | 10/10 R |
| 3,180,126 | 4/1965 | Carlson | 10/10 R X |
| 3,295,154 | 1/1967 | Watson et al. | 10/152 T |
| 3,469,491 | 9/1969 | Munsey | 85/47 |
| 3,472,119 | 10/1969 | Peterson | 85/47 |
| 3,530,760 | 9/1970 | Lindstrand | 85/46 |
| 3,633,455 | 1/1972 | Larson | 85/46 |
| 3,683,437 | 8/1972 | Larson | 85/46 X |
| 3,772,720 | 11/1973 | Yamamoto | 10/10 R |
| 3,878,759 | 4/1975 | Carlson | 85/46 |

FOREIGN PATENT DOCUMENTS

| | | | |
|---|---|---|---|
| 1,022,355 | 3/1966 | United Kingdom | 85/46 |

*Primary Examiner*—Roy D. Frazier
*Assistant Examiner*—Rodney H. Bonck

[57] ABSTRACT

A thread forming screw has a tapering lead end from which helical threads extend with a uniform root diameter onto a cylindrical shank. Proceeding from the tip of the lead end, there are progressively higher discontinuous thread crests in the form of pyramidal elevations that merge into a continuous thread with adjacent ever higher flat surfaces on the thread crest that intersect each other forming sharp longitudinal line crests. When maximum thread height is substantially reached by the line crests, a transition portion has identical line crests between identical flat areas for at least one thread turn. Full threads then continue on the shank of the screw. The screw is formed by the method of rolling threads on a blank having a tapered point with intersecting flat sides, a prismatic transition portion adjacent to the point, and sloping flats leading from the sides of the transition portion in a cylindrical shank.

2 Claims, 10 Drawing Figures

THREAD FORMING SCREW

CROSS-REFERENCES TO RELATED APPLICATIONS

This application is a continuation-in-part of my now abandoned patent application Ser. No. 523,689 filed Nov. 14, 1974 and entitled: THREAD FORMING SCREW.

BACKGROUND OF THE INVENTION

1. Field of the Invention:

This invention relates to thread forming screws which deform and do not cut the wall of the pre-drilled hole into which they are turned to form threads. The thread forming screw of this invention has its threads rolled on a particular blank of a given geometry to provide a superior screw which requires less torque to drive it.

2. Description of the Prior Art

There are many thread forming screws which are made by rolling threads on blanks of various configurations. None of these have the specific features of the screw of the instant invention.

SUMMARY OF THE INVENTION

This invention provides a thread forming screw to be turned into a hole in softer material and form a thread therein. The screw is best made by rolling threads on a particular blank. The blank has a tapered point which preferably has seven flat sides tapering at an angle of between five and thirteen degrees with respect to the axis of the blank. A prismatic seven-sided transition portion is formed adjacent to the tapered point, the transition portion sides intersecting to form sharp longitudinal corners. Sloping surfaces extend outward from the ends of the sides of the transition portion into a cylindrical shank of the blank.

When threads of uniform root diameter are rolled on the blank, the seven corners of the tapered point are first contacted and deformed to form unconnected pyramidal elevations on each side of the thread root. The pyramidal elevations become progressively higher as the sharp corners taper outwards and the thread rollers enter them more deeply. When the thread rolling dies engage the entire width of a flat surface of the point, a continuous thread is formed with flat surfaces at its crest and sharp longitudinal line crests at intersections of the flat surfaces. The flat surfaces become narrower and higher as the point widens until the longitudinal line crests substantially reach the height of the full thread crest. At this point, the transition portion of the blank forms at least one turn of seven or more line crests of the same height between identical flat areas. After the transition portion, the sloping surfaces extending into the shank form flat areas of diminishing size until a thread with a continuous crest is formed on the shank. The longitudinal line crests are not perfectly straight but tend to have ends that are raised above their centers. This provides a desirable material forming contour.

The transition portion of the blank may have sides that extend longitudinally for greater or less distances to the sloping areas that extend into the shank. The rearward extension of the transition portion may form a broken right or left hand spiral or it may have its sides end at random distances into the shank. While the point preferably has flat tapering sides with sharp corners at their intersections, the screw of this invention will function if the point is conical and the sides of the prismatic transition portion extend therein.

The progressively higher pyramidal elevations of the thread forming screw and then the continuous thread with ever higher flat areas at the crest thereof with sharp longitudinal line crests therebetween progressively deform material as a screw is turned into it in a very efficient manner requiring very little torque. The pyramidal elevations and the line crests provide sharp material deforming edges unlike other thread forming screws. Thus, even without the transition portion, drive torque would be lower. However, progressively deformed material, as with all deformed material, tends to flow back or spring back to its original un-deformed state. Without a transition portion, this flow binds the continuous threads at the shank to produce high friction and unnecessary torque. The transition portion with its uniform line crests at substantially the height of the final thread crest irons out this inward flow or spring back to greatly reduce the maximum torque required to drive a given thread forming screw. The transition portion also serves to iron out any potentially higher torque which might be caused by slight irregularities in the formation of a blank or slight irregularities formed during the thread rolling process.

Lower torque to drive a thread rolling screw has many advantages in production such as less operator fatigue and resulting higher production, less wear on driving tools in automatic production, etc. Thus this invention provides a superior thread forming screw and the method for its fabrication.

DESCRIPTION OF THE PREFERRED EMBODIMENT

Figure 2:
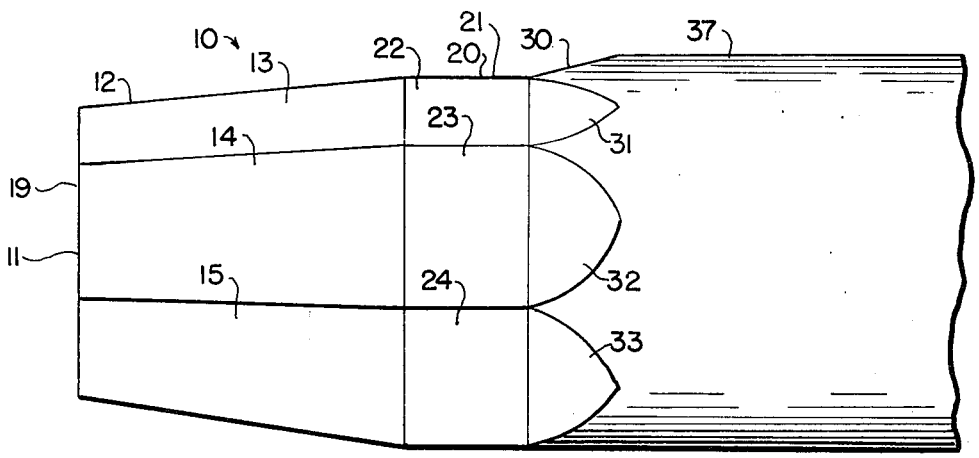
FIG. 2 is a side view of a broken away lead end of a blank on which threads are rolled to form the screw of this invention.
Figure 3:
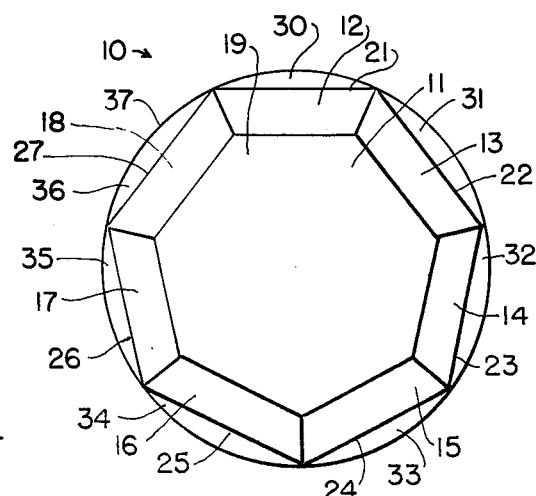
FIG. 3 is a front view of the blank of FIG. 2.

As shown in FIGS. 2 and 3, a preferred embodiment of this invention is formed from a screw blank 10 having a tapered point or lead end 11 with seven flat sides 12-18 formed thereon at an angle between five and thirteen degrees with the axis of the blank 10. The angle of the sides 12-18 is preferably about 6°. The lead end 11 may have a flat end 19 formed where it tapers to a width less than the diameter of the roots of the threads to be rolled thereon.

Behind point 11 at a location which will be hereinafter defined, a prismatic transition portion 20 has seven sides 21-27. Behind transition portion 20, outwardly sloping flats 30-36 are let into the cylinder shank 37. The flats 30-36 are preferably formed at a greater angle with the axis of blank 10 than are sides 12-18 of point 11. In one example of this invention, sides 12-18 were at an angle of six degrees and flats 30-36 were at an angle of 12°.

Figure 1:
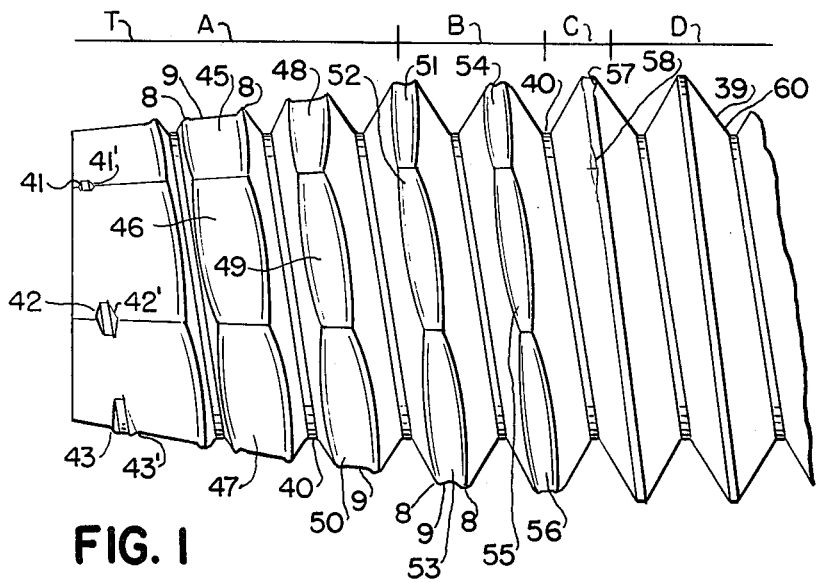
FIG. 1 is a side view of a broken away lead end of a thread forming screw according to this invention.

Thread rollers (not shown) roll threads on blank 10. As shown in FIG. 1, the thread rollers roll a thread 39 with a root 40 of uniform depth from the lead end rearwardly. At the lead end, the thread rollers first form the discontinuous pairs of pyramidal elevations 41 and 41', 42 and 42', and 43 and 43'. The root 40 of the threads 39 spirals deeper below the surface of a blank 10 as it moves back from lead end 11 toward shank 37. As the thread rollers make contact completely across a face 12-18, they thereafter form a continuous thread having progressively higher and narrower flat surface 48, 49 and 50 at its crest. When the thread rollers reach the transition portion 20, they form substantially identical flat surfaces 51-56 on the crest of thread 39. Between adjacent flat surfaces 48-53, there are formed at their intersections sharp longitudinal line crests 9 which have slightly raised ends 8.

Over the outwardly sloping flats 31-33, the flat areas 57 and 58 diminish to give way to the final uniform thread 60 on shank 37. Thus the tapered lead end 11 of blank 10 terminates and transition portion 20 is formed at a location where the thread rollers will force the material of the blank to substantially the height of the full threads at the longitudinal line crests.

Figure 4:
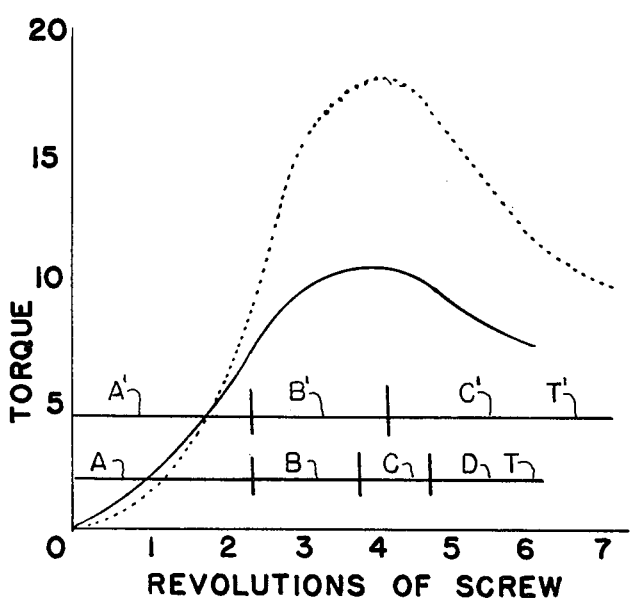
FIG. 4 is a graph showing torque required to drive a thread forming screw with a transition portion and the higher torque required to drive a thread forming screw without a transition portion.

The thread forming screw of this invention forms threads with less torque than other thread forming screws because the sharp line crests 9 and the pyramidal elevations 41-43' have less friction than would rounded elements. Thus these elements alone provide a superior thread forming screw. The torque required to drive a screw formed according to this invention without a transition portion is shown in the graph of FIG. 4 as a dotted line.

Material deformed by a thread forming screw being turned therein tends to spring or flow back to its original position to some extent. This causes torque due to excessive friction when the uniform threads of the shank are reached. The transition portion 20 of blank 10 provides line crests 9 thereover at substantially full thread height. These line crests 9 in transition portion 20 iron out this flow and greatly reduce torque as shown in the solid line in the graph of FIG. 4. In this graph, portion A of line T represents the lead end of a thread forming screw, portion B represents the transition portion, portion C represents the threads formed over the outwardly sloping flats, and portion D represents the threads formed on the shank. The torque as these portions enter an aperture is graphed by the solid line. In a like manner, portion A' of line T' represents the lead end of a screw without a transition portion, portion B' represents threads formed over outwardly sloping flats let into the shank, and portion C' represents the shank threads. From the graph of FIG. 4, it may be seen that the transition portion on a blank can reduce maximum drive torque requirements almost 45 percent.

Figure 5:
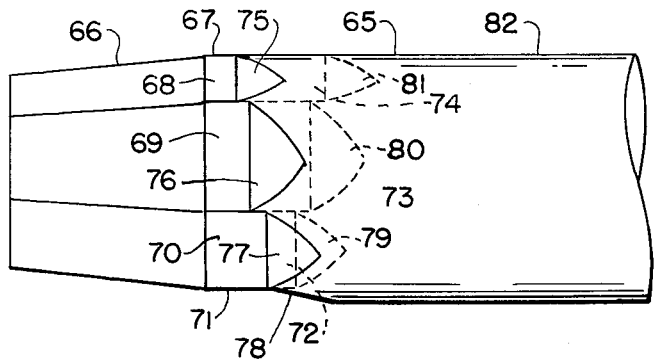
FIGS. 5, 6 and 7 are side views of broken away lead ends of modified thread forming screw blanks.

Referring now to FIG. 5, a blank 65 has a lead end 66 with tapering flat sides. A transition portion 67 has flat prismatic sides 68-74 of increasing length to end in a single right hand broken spiral of one revolution at the transition to the outwardly sloping flats 75-81 in shank 82.

Figure 6:
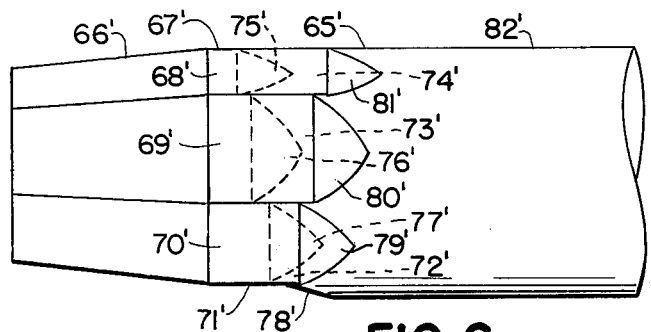
Figure 8:
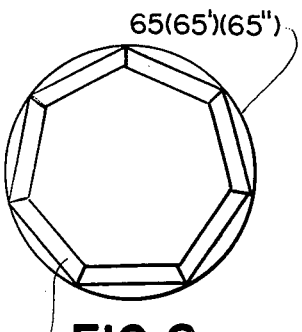
FIG. 8 is a front view of the blanks of FIGS. 5, 6 and 7.

As shown in FIG. 6, blank 65' is identical to blank 65 except that its transition portion 67' ends in a left hand broken spiral of one turn.

Figure 7:
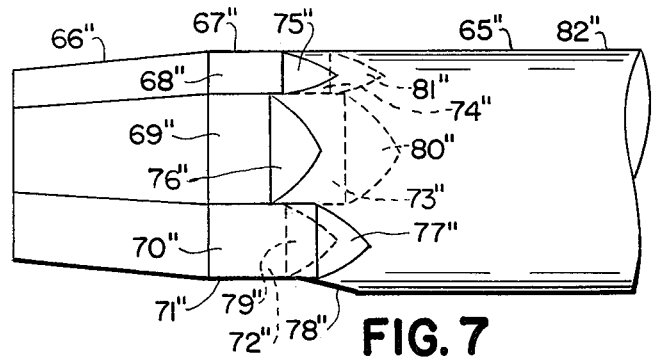

As shown in FIG. 7, blank 65'' has its transition portion 67'' with flat sides 68''-74'' of random lengths to end at random locations. It has been found it is best not to have transition portions end in a spiral that corresponds to the spiral of the threads rolled thereon. If the spiral is in the same direction as that of the threads it should be of a greater pitch or advance.

Figure 10:
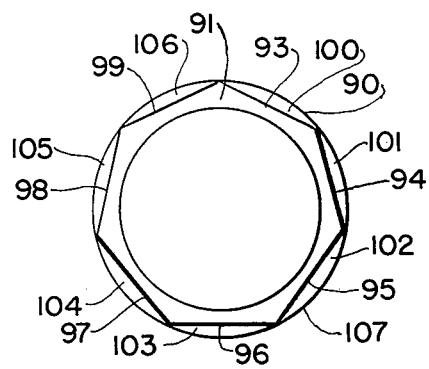
FIG. 10 is a front view of the blank of FIG. 9.
Figure 9:
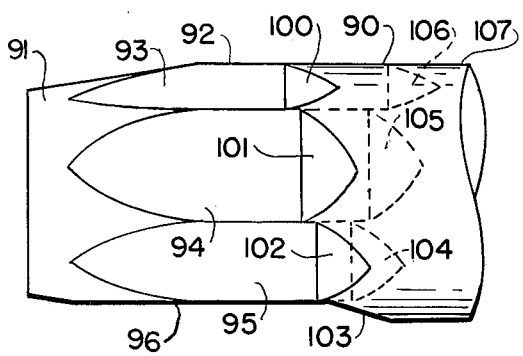
FIG. 9 is a side view of a broken away lead end of a thread forming screw blank according to a second embodiment of this invention.

Referring now to FIGS. 9 and 10, a second embodiment of this invention has a blank 90 with a conical lead end 91. A prismatic transition portion 92 has seven faces 93-99 extending forward into the lead end and terminating rearwardly at the broken spiral formed at the intersection of the faces 93-99 with the outwardly sloping flats 100-106 in shank 107. Although the conical lead end of blank 90 does not provide pyramidal elevations or sharp line crests on a thread rolled thereover, the transition portion 92 produces flat areas on the thread crest rolled thereover with sharp line crests at their intersections. These transition portion longitudinal line crests at substantially the full thread height sufficiently lower drive torque to provide a satisfactory thread forming screw.

Although a blank having a lead end 11 and a transition portion 20 with other than seven sides could be used, seven sides has been found to be the most desirable number.

While this invention has been shown and described in the best forms known, it will nevertheless be understood that these are purely exemplary and that modifications may be made without departing from the spirit of the invention.

What is claimed is:

1. A thread forming screw comprising, in combination, a lead end, a shank, progressively higher threads extending from said lead end on to said shank, at least some of said progressively higher threads having flat areas at the thread crests with adjacent flat areas intersecting to form sharp longitudinal line crests with slightly higher ends, said flat areas being of progressively increasing height and decreasing width away from said lead end, a transition portion having at least one turn of a thread thereon having substantially identical flat areas at the thread crest with adjacent flat areas intersecting to form longitudinal line crests with slightly higher ends, said line crests of said transition portion being of substantially the height of the crests of said threads on said shank, and progressively smaller flat areas on the crest of said thread between said transition portion and said shank, said shank having a full thread with a continuous crest thereon, said thread crest having seven of said flat areas for each turn of said thread having said flat areas thereon.

2. The combination according to claim 1 wherein said lead end has a tip and pairs of progressively higher pyramidal elevations spiraling rearwardly from the tip of said lead end, said progressively higher threads extending from pairs of pyramidal elevations on said lead end.

* * * * *